United States Patent [19]

Mendy et al.

[11] 4,038,421
[45] July 26, 1977

[54] NONALCOHOLIC BEVERAGE

[75] Inventors: Francois Mendy, Boulogne; Michel Delage; Jean Teissier, both of Paris, all of France

[73] Assignee: Roussel-UCLAF, Paris, France

[21] Appl. No.: 684,773

[22] Filed: May 10, 1976

[30] Foreign Application Priority Data

May 16, 1975 France .................... 75.15383

[51] Int. Cl.² .................................. A23L 2/00
[52] U.S. Cl. ........................ 426/72; 426/74; 426/590
[58] Field of Search ............ 426/72, 74, 590, 599

[56] References Cited

U.S. PATENT DOCUMENTS

| | | | |
|---|---|---|---|
| 2,087,076 | 7/1937 | Wadsworth et al. | 426/599 |
| 2,224,252 | 12/1940 | Callaway | 426/590 |
| 2,919,195 | 12/1959 | Block | 426/599 |
| 3,652,290 | 3/1972 | Hammes et al. | 426/72 |
| 3,657,424 | 4/1972 | Aktins et al. | 426/74 |

Primary Examiner—Jeanette M. Hunter
Attorney, Agent, or Firm—Bacon & Thomas

[57] ABSTRACT

Nonalcoholic beverages characterized in that they contain at least galactose, riboflavine, nicotinic acid and mineral elements; also disclosed are concentrates thereof.

9 Claims, No Drawings

NONALCOHOLIC BEVERAGE

This invention relates to and has as its object nonalcoholic beverages.

Beverages are generally classified on the basis of whether or not they are alcoholic or nonalcoholic. Generally by nonalcoholic beverages are intended sodas of various kinds, mineral water, fruit and vegetable juices, lemonades, syrups, fruit drinks, infusions, milk, coffee, tea, chocolate, and the like. Generally, all such nonalcoholic beverages contain even after fermentation not more than 1° of alcholol. In the following specification and claims a nonalcoholic beverage will be understood to be a beverage which has not more than 1° of alcohol.

Such nonalcoholic beverages contain the best known glucides in variable quantities but the diversity in quality of these glucides is very limited since they reduce to sucrose, to lactose, to maltose, to glucose, to fructose, to sorbitol, and to honey.

Thus, these nonalcoholic beverages actually do not contain galactose, either naturally or by addition. Milk itself does not contain galactose but lactose in the proportion of about 50 g/l. This lactose is transformed by enzymatic decomposition in the digestive tract to galactose and glucose.

Milk is the sole natural source of lactose, and there does not exist a liquid supply which can carry galactose directly to the organism. The only supply is indirect and comes from the lactose contained in milk. Other sources of lactose are milk products such as yogurt, which contains much less lactose than milk; butters and cheeses do not contain practical amounts of lactose. Also, it is now known that galactose is one of the most important carbohydrate among those which enter the constitution of animal and human tissues. The carbohydrates are present in animal and human tissue in three main forms: free polymers, glycoprotides and glycolipdes.

The free polymers comprise notably hyaluronic acid, a polymer in equivalent proportions of glycuronic acid and N-acetyl-glycosamine. It is to be appreciated that the precursor of glycuronic acid is galactose. The glucidic fraction of he glycorprotides is constituted by glucides, in particular galactose and N-acetyl-D-galactosamine.

The glycolipides may be subdivided into cerebrosides which embrace the monocerebrosides (which include the galactolipides and the cerebropolyosides (certain of which contain galactose) andte cerebrosulfatides, the main one of which is cerebrogalactoside 6-sulfate.

Thus, the importance of galactose in the constitution of tissue can be seen. This is why it is useful to insure a frequent supply of galactose to the organism in a form which is easy to absorb and which is directly assimilable.

Applicants were thus lead to the study of new nonalcoholic beverages which permit and supply of galactose and its utilisation factors simultaneously to the organism, in a ratio as efficient as possible.

Riboflavine, nicotinic acid, and to a lesser degree certain mineral elements are able to be called utilization factors of galactose because they enter into the consitution of certain enzymes used for the metabolism of galactose.

The present invention thus has for an object novel nonalcoholic beverages characterized in that they contain at least galactose, riboflavine, nicotinic acid and mineral elements.

By mineral elements, those mineral substaces which contain alkali, alkaline earth metals as well as phosphorus are intended.

Among the nonalcoholic beverages which are the object of this invention are those described above where the mineral elements include at least potassium, sodium, phosphorus and magnesium.

Among the nonalcoholic beverages which are the object of the prsent invention are those particularly characterized in that they contain 30 to 100 g/L of galactose, 15 $\mu$g to 65 $\mu$g of riboflavine per gram of galactose and 35 $\mu$g to 50 $\mu$g of nicotinic acid per gram of galactose.

There may be mentioned especially the nonalcoholic beverages which have been described above, in which the amount of potassium present is between 480 and 1800 mg/L, the amount of sodium is between 48 and 480 mg/L, the amount of phosphorus is between 128 and 1080 mg/L and the amount of magnesium is between 40 and 144 mg/L.

Among the latter nonalcoholic beverages, there may be mentioned those in which the potassium is present in an amount of betwen 600 and 1500 mg/L, sodium is present in an amount of between 60 and 400 mg/L, the ratio of potassium to sodium is between 3.75 and 10; the amount of phosphorus is between 160 and 900 mg/L, and the amount of magnesium is between 50 and 120 mg/L.

The nonalcoholic beverages of this invention may also advantageously contain amino acids which are glycoformers for cardiac muscle fibers, such as L-aspartic acid and glutamic acid.

The present invention therefore has an object nonalchoholic beverages as previously defined, characterized in that they also contain L-aspartic acid and/or glutamic acid.

The preferred beverages of the invention contains L-aspartic acid in an amount of from 500 to 1660 mg/L and an amount of glutamic acid of between 1150 and 6800 mg/L.

The invention has a final object as a means necessary for carrying out the invention, concentrates characterized in that they contain at least galactose, riboflavine, nicotinic acid and mineral elements. These concentrates may be diluted to form the above described beverages.

Among the concentrates of the invention are the solutions previously defined, characterized in that the mineral elements include at least potassium, sodium, phosphorus and magnesium.

The concentrates of the invention, may also advantageously contain L-aspartic acid and/or glutamic acid. These concentrated solutions as above defined may be used to prepare the novel nonalcoholic beverages of this invention.

The different constituents which form the nonalcholholic beverages and/or concentrated solutions thereof which are the object of the present invention may be supplied as follows: galactose, riboflavine and nicotinic acid may be utilized as such.

Preferably, riboflavine and the nicotinic acid may be supplied from fruit extracts which are rich in riboflavine and nicotinic acid as particularly apricot extract, huckleberry extract or other different berry extracts known to be rich in these substances. One can also provide to the preparations a complement of riboflavine and nicotinic acid so as to obtain the contents indicated.

The mineral elements may be advantageously added in the following forms:

Potassium is advantageously added in the form of water soluble potassium salts, such as potassium chloride, monopotassium phosphate, dipotassium phosphate, potassium L-aspartate or potassium glutamate.

Sodium may advantageously be added in the form of sodium chloride, disodium phosphate, sodium glycerophosphate or sodium glutamate.

The phosphorus is advantageously added as a phosphate such as monopotassium phosphate, dipotassium phosphate, disodium phosphate, magnesium monobasic phosphate or sodium glycerophosphate.

Magnesium may be advantageously added as magnesium chloride, or monobasic magnesium phosphate.

L-aspartic acid may be added in the form of the acid itself, or as a salt, such as sodium L-asparate or potassium L-asparate or as a mixture of the acid and its salts.

Glutamic acid may be added itself or as one of its salts, such as sodium glutamate, or potassium glutamate or as a mixture of the acid and one of its salts.

In addition to galactose, the nonalcoholic beverages which are the object of this invention may also contain certain suqars, such as particularly, fructose, sucrose, or maltitol, which is a product of the hydrogenation of maltose syrup. The beverages may also contain other flavor additives.

The nonalcoholic beverages of the present invention are advantageously prepared by successively dissolving in a small amount of water the mineral element salts, galactose and the fruit extracts containing riboflavine and nicotinic acid followed by the addition of water to prepare the desired volume. The nonalchoholic beverages thus obtained may then be pasteurized.

This pasteurization may be effected for example by heating the beverage in an autoclave at a temperature of 73° to 75° C. for 20 to 25 minutes.

When, according to the invention, it is desired to prepare a more elaborated nonalchoholic beverage, one may advantageously dissolve in a little water th salts containing the mineral elements, the L-aspartic acid and/or glutamic acid, galactose and, if desired the other sugars, than add the fruit extracts and additional water to make the appropriate volume. The nonalcoholic beverage thus obtained may then be pasteurized.

When a fizzy beverage is desired, carbon dioxide (carbonic anhydride) can be added before making up to the desired volume.

The concentrated solutions which are used to prepare the nonalchoholic beverages just described, may advantageously be prepared by dissolving the various ingredients in the minimum amount of water and then pasteurized to obtain the concentrated solution.

The concentrated solutions are advantageously diluted at the time of use by the simple addition of water.

Modern man in consuming a beverage looks for appeasement of his thirst and a tonic, even stimultating effect. These effects may be brought about by the ingestion of an alcoholic beverage or by the ingestion of a nonalcoholic beverage such as tea or coffee. Unfortunately, these effects are always produced at the expense of the organism.

These tonic and/or stimultating effects may equally be provided by the ingestion of sugar based beverages such as sodas or fruity beverages. The ingestion of these sugar beverages present certain disadvantages because they notably cause a hypoglycemic rebound effect following the hyperglycemia which follows the ingestion of a suqar based beverage.

The nonalcoholic beverages of the present invention permit the replacement of all or part of the suqar contained in the conventional beverages by galactose, while lessening the aforementioned disadvantages and producing a tonic effect.

The nonalcoholic beverages of the present invention provide the organism with a mineral equilibrium of mineral elements, particularly sodium, potassium, phosphorus and magnesium.

The following are non limiting examples of the present invention;

EXAMPLE 1

A nonalcoholic beverage of the following formula was prepared:

| | | |
|---|---|---|
| Galactose | 35 | grams |
| Fructose | 15 | grams |
| Sucrose | 50 | grams |
| Potassium L-aspartate | 1 | gram |
| L-aspartic acid | 0.430 | gram |
| Sodium chloride | 0.150 | gram |
| Magnesium chloride 6 $H_2O$ | 0.420 | gram |
| Potassium chloride | 0.340 | gram |
| Monopotassium phosphate | 0.700 | gram |
| Citric acid | 1 | gram |
| Carbon dioxide | 5 | grams |
| Huckleberry extract | 7 | grams |
| Water q.s. for | 1 | liter |

The indicated amounts of sodium chloride, magnesium chloride, potassium chloride, monopotassium phosphate, potassium L-aspartate, L-aspartic acid, citric acid, galactose, fructose, sucrose and huckleberry extract are successively dissolved in 900 ml of water. Carbon dioxide and enough water to make a liter is added and the composition is pasteurized at 73° to 75° C for 20 to 23 minutes.

EXAMPLE 2

A nonalcoholic beverage corresponding to the following formula was prepared:

| | | |
|---|---|---|
| Galactose | 35 | grams |
| Sucrose | 65 | grams |
| Potassium L-aspartate 1/2 $H_2O$ | 0.500 | gram |
| L-Aspartic acid | 0.135 | gram |
| Potassium glutamate 1 $H_2O$ | 0.565 | gram |
| Glutamic acid | 0.745 | gram |
| Sodium chloride | 0.150 | gram |
| Magnesium chloride 6 $H_2O$ | 0.420 | gram |
| Potassium chloride | 0.340 | gram |
| Monopotassium phosphate | 0.700 | gram |
| Citric acid | 1 | gram |
| Carbon dioxide | 5 | grams |
| Huckleberry extract | 7 | grams |
| Water q.s. for | 1 | liter |

Chlorides of sodium, magnesium and potassium, monopotassium phosphate, potassium L-aspartate, L-aspartic acid, potassium glutamate, glutamic acid, citric acid, galactose, sucrose, and huckleberry extract are successively dissolved in 900 ml of water. Carbon dioxide is then added and enough additonal water to make 1 liter. The mixture is then pasteurized at 73° to 75° C for 20 to 23 minutes.

EXAMPLE 3

A nonalcoholic beverage corresponding to the following formula was prepared:

| | | |
|---|---|---|
| Galactose | 35 | grams |
| Fructose | 15 | grams |
| Maltitol (a hydrogenation product of Maltose syrup) | 50 | grams |
| Potassium L-aspartate | 1 | gram |
| L-aspartic acid | 0.430 | gram |
| Sodium chloride | 0.150 | gram |
| Magnesium chloride 6 H₂O | 0.420 | gram |
| Potassium chloride | 0.340 | gram |
| Monopotassium phosphate | 0.700 | gram |
| Citric acid | 1 | gram |
| Carbon dioxide | 5 | grams |
| Huckleberry extract | 7 | grams |
| Water q.s. for | 1 | liter |

The chlorides of sodium, magnesium, and potassium monopotassium phosphate, potassium L-aspartate, L-aspartic acid, citric acid, galactose, frucctose, maltitol and the huckleberry extract were successively dissolved in 900 ml of water. Carbon dioxide was then added with enough additional water to make a liter of the composition which was then pasteurized at 73° to 75° C for 20 to 23 minutes.

EXAMPLE 4

A nonalcoholic beverage according to the following formula was prepared:

| | | |
|---|---|---|
| Galactose | 35 | grams |
| Fructose | 15 | grams |
| Sucrose | 50 | grams |
| Potassium L-aspartate | 1.600 | gram |
| Disodium phosphate 7 H₂O | 0.350 | gram |
| Monobasic magnesium phosphate 3 H₂O | 0.530 | gram |
| Citric acid | 1 | gram |
| Carbon dioxide | 5 | grams |
| Huckleberry extract | 7 | grams |
| Water q.s. for | 1 | liter |

The phosphates of sodium and magnesium, potassium aspartate, citric acid, fructose, galactose, sucrose and the huckleberry extract were successively dissolved in 900 ml of water. Carbon dioxide was added and enough water to form 1 liter of the composition which was pasteurized at 73° to 75° C for 20 to 23 minutes.

EXAMPLE 5

A nonalcoholic beverage according to the following formula was prepared:

| | | |
|---|---|---|
| Galactose | 35 | grams |
| Sucrose | 65 | grams |
| Potassium L-aspartate | 0.800 | gram |
| Potassium glutamate | 1.420 | gram |
| Disodium phosphate 7 H₂O | 0.350 | gram |
| Monobasic magnesium phosphate 3 H₂O | 0.530 | gram |
| Citric acid | 1 | gram |
| Carbon dioxide | 5 | grams |
| Huckleberry extract | 7 | grams |
| Water q.s. for | 1 | liter |

Sodium and magnesium phosphate, potassium asparatate, potassium glutamate, citric acid, galactose, sucrose, and the huckleberry extract were successively dissolved in 900 ml of water. Carbon dioxide was added and enough water to make 1 Liter of the composition which was then pasteurized at 73° to 75° C for 20 to 23 minutes.

EXAMPLE 6

A nonalcoholic beverage was prepared having the following formula:

| | | |
|---|---|---|
| Galactose | 35 | grams |
| Fructose | 15 | grams |
| Maltitol (hydrogenation product of maltose syrup) | 50 | grams |
| Potassium L-aspartate | 1.600 | gram |
| Disodium phosphate 7 H₂O | 0.350 | gram |
| Monobasic magnesium phosphate 3 H₂O | 0.530 | gram |
| Citric acid | 1 | gram |
| Carbon dioxide | 5 | grams |
| Huckleberry extract | 7 | grams |
| Water q.s. for | 1 | liter |

The phosphates of sodium snd magnesium, potassium appartate, citric acid, galactose, fructose, maltitol and the huckleberry extract were dissolved successively in 900 ml of water. Carbon dioxide was added and enough water to make 1 liter solution which was pasterurized at 73° to 75° C for 20 to 23 minutes.

EXAMPLE 7

A concentrated solution having the following formula was prepared:

| | | |
|---|---|---|
| Galactose | 35 | grams |
| Fructose | 15 | grams |
| Sucrose | 50 | grams |
| Potassium L-aspartate | 1 | gram |
| L-aspartic acid | 0.430 | gram |
| Sodium chloride | 0.150 | gram |
| Magnesium chloride 6 H₂O | 0.420 | gram |
| Potassium chloride | 0.340 | gram |
| Monopotassium phosphate | 0.700 | gram |
| Citric acid | 1 | gram |
| Huckleberry extract | 7 | grams |
| Water q.s. for | 250 | ml |

Monopotassium phosphate, the chlorides of sodium, magnesium and potassium, potassium L-aspartate, L-aspartic acid, citric acid, galactose, fructose, sucrose and huckleberry extract were successively dissolved in 225 ml of water. Additional water was added to make 250 ml and the mixture was pasteurized at 73° to 75° C for 20 to 23 minutes.

The embodiments of the invention in which an exclusive property or privilege is claimed are defined as follows:

1. A nonalcoholic beverage which comprises 30 to 100 grams/l of galactose, 15 $\mu$ grams to 65 $\mu$ grams of riboflavine per gram of galactose and 35 $\mu$ grams to 50 $\mu$ grams nicotinic acid per gram of galactose and mineral elements potassium, sodium, phosporous and magnesium.

2. The nonalcoholic beverage of claim 1 wherein the proportion of potassium is between 480 and 1800 mg/L, the proportion of sodium is between 48 and 480 mg/L, the proportions of phosphorus is between 128 and 1080 mg/l, and the proportion of magnesium is between 40 and 144 mg/L.

3. The nonalcoholic beverage of claim 2 wherein the proportion of potassium is between 600 and 1500 proportion the proporton of sodium is between 60 and 400 mg/L, the ratio of potassium to sodium is between 3.75 and 10, the proportion of phosphorus is between 160 and 900 mg/L, and the proportion of magnesium is between 50 and 120 mg/L.

4. The nonalcoholic beverage of claim 1 which also contains L-aspartic acid and glutamic acid or one of these acids.

5. The nonalcoholic beverage of claim 4 wherein the proportion of L-aspartic acid is between 500 and 1660 mg/L and the proportions of glutamic acid is between 1150 and 6800 mg/L.

6. The nonalcoholic beverage of claim 1 which has the following formula:

| | |
|---|---|
| Galactose | 35 grams |
| Fructose | 15 grams |
| Sucrose | 50 grams |
| Potassium L-aspartate | 1 gram |
| L-aspartic acid | 0.430 gram |
| Sodium chloride | 0.150 gram |
| Magnesium chloride 6 $H_2O$ | 0.420 gram |
| Potassium chloride | 0.340 gram |
| Monopotassium phosphate | 0.700 gram |
| Citric Acid | 1 gram |
| Carbon dioxide | 5 grams |
| Huckleberry extract | 7 grams |
| Water q.s.p. | 1 Liter. |

7. The nonalcoholic beverage of claim 1 which is carbonated.

8. The nonalcoholic beverage of claim 1 wherein the riboflavine and nicotinic acid is added in the form of huckleberry extract or apriocot extract.

9. A nonalcoholic beverage concentrate cmprising 30 to 100 grams/l of galactose, 15 $\mu$ grams to 65 $\mu$ grams of riboflavine per gram of galactose and 35 $\mu$ grams nicotinic acid per gram of galactose, potassium, sodium, phosphorous and magnesium.

* * * * *

UNITED STATES PATENT AND TRADEMARK OFFICE
CERTIFICATE OF CORRECTION

PATENT NO. : 4,038,421
DATED : July 26, 1977
INVENTOR(S) : MENDY et al.

It is certified that error appears in the above-identified patent and that said Letters Patent are hereby corrected as shown below:

Column 1, line 45, "glycorprotides" should read --glycoprotides--;

line 50, "galactolipides" should read --galactolipides)--;

line 51, "andte" should read --and the--;

Column 2, line 11, "prsent" should read --present--;

Column 3, line 41, "th" should read --the--;

line 43, "than" should read --then--;

IN THE CLAIMS:

Column 6, line 66, "proporton" should read --proportion--;

Column 8, line 17, "35 µ grams" should read --35 µ grams to 50 µ grams--.

Signed and Sealed this

Sixth Day of December 1977

[SEAL]

Attest:

RUTH C. MASON
Attesting Officer

LUTRELLE F. PARKER
Acting Commissioner of Patents and Trademarks